May 10, 1960     D. A. BUCK     2,936,435
HIGH SPEED CRYOTRON

Filed Jan. 23, 1957     2 Sheets-Sheet 1

INVENTOR.
DUDLEY A. BUCK
BY
BLAIR & SPENCER

ATTORNEYS

May 10, 1960   D. A. BUCK   2,936,435
HIGH SPEED CRYOTRON
Filed Jan. 23, 1957   2 Sheets-Sheet 2

INVENTOR.
DUDLEY A. BUCK
BY
BLAIR & SPENCER
ATTORNEYS

United States Patent Office 2,936,435
Patented May 10, 1960

2,936,435

HIGH SPEED CRYOTRON

Dudley A. Buck, North Wilmington, Mass., assignor to Arthur D. Little, Inc., Cambridge, Mass.

Application January 23, 1957, Serial No. 635,786

17 Claims. (Cl. 338—32)

This invention relates to an improved construction for a superconductive computing element known as a cryotron. More particularly, it relates to a high speed cryotron.

Figure 4:
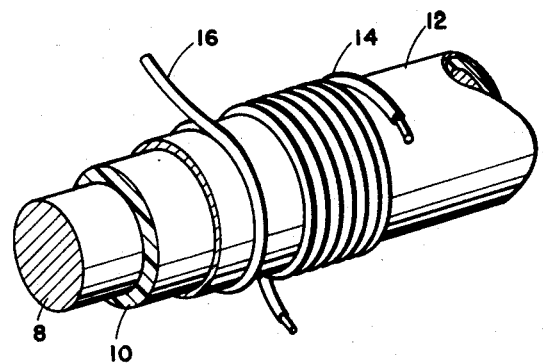
Figure 5:
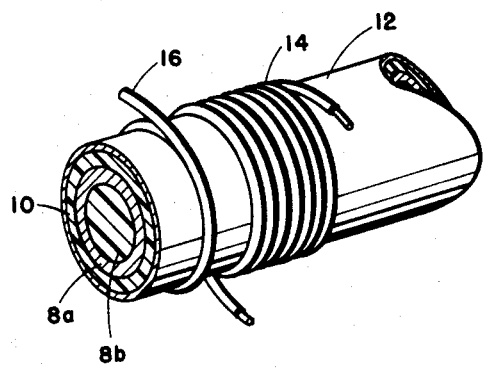
Figure 2:
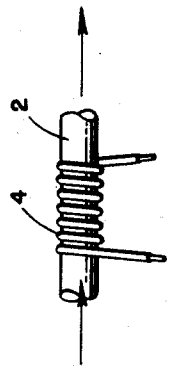
Figure 1:
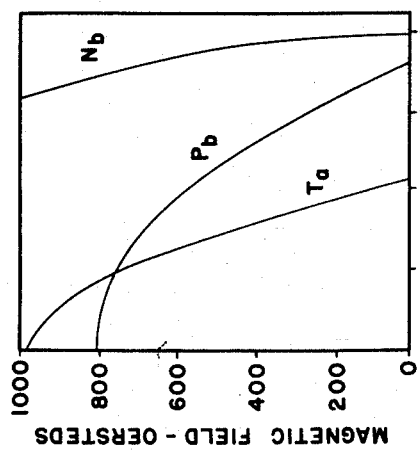
Figure 3:
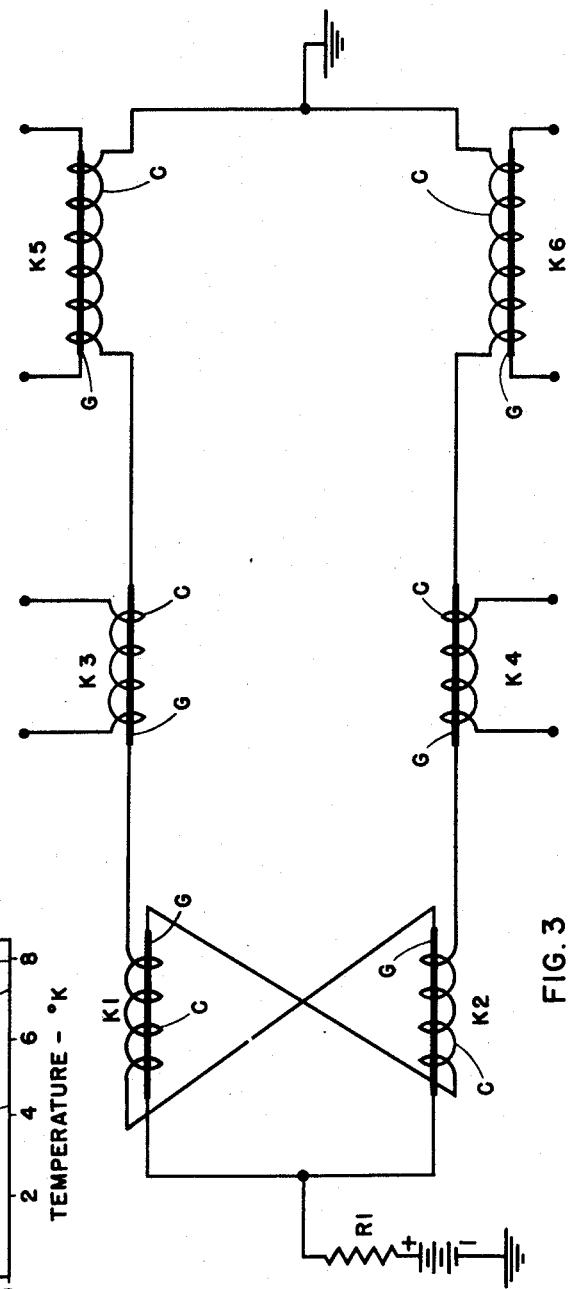

Cryotron construction and operation may best be understood from the following description taken with the accompanying drawings in which:

Figure 1 is a family of curves for different materials showing how the temperature at which a material becomes superconductive changes as a function of applied magnetic field, Figure 2 is a diagrammatic representation of a conventional cryotron, Figure 3 is a diagrammatic representation of a cryotron flip-flop or multivibrator circuit, Figure 4 is a fragmentary perspective of an improved high speed cryotron made according to my invention, and Figure 5 is a perspective view similar to Figure 4 showing another embodiment of my invention.

The cryotron, which is a switching element useful in digital computers, depends for its operation on the changes in properties of certain electrical conductors when subjected to temperatures approaching absolute zero. In the absence of a magnetic field, these materials change suddenly from a resistive state to a superconductive state in which their resistance is identically zero as the temperature approaches absolute zero. The temperature at which this change occurs is known as the transition temperature. When a magnetic field is applied to the conductor, the transition temperature is lowered, the relationship between applied magnetic field and transition temperature for a number of these materials being shown in Figure 1. As shown in this figure, in the absence of a magnetic field, tantalum loses all electrical resistance when reduced to a temperature of 4.4° K. or below, lead does so at 7.2° K. and niobium at 8° K. In all, there are 21 elements in addition to many alloys and compounds which undergo transition to the superconductive state at temperatures ranging between 0 and 17° K. The presence of a magnetic field causes the normal transition temperature to move to a lower value, or, if a constant temperature is maintained, a magnetic field of sufficient intensity will cause the superconductive material to revert to its normal resistive state. From Figure 1 it is apparent that a magnetic field of between 50 and 100 oersteds will cause a tantalum wire held at 4.2° K. (the temperature of liquid helium at atmospheric pressure) to change from a superconducting to a resistive state.

The cryotron is a circuit element which makes use of the shift between the superconductive and normal resistive states of these materials, when held at constant temperatures. For example, Figure 2 illustrates a cryotron having a central or gate conductor 2, about which is wound a control coil 4, both the gate conductor and the coil being of materials which are normally superconductive at depressed temperatures. The entire unit is immersed in liquid helium to render the gate wire 2 and the control wire 4 superconductive. If a current of sufficient magnitude is applied to the control coil, the magnetic field produced thereby will cause the gate conductor to transfer from a superconductive to a resistive state. Thus the control coil and gate wire form an electrically operated switch which can be changed from a superconductive to a resistive state by the application of current to the control coil.

Tantalum is the preferable material for gate conductors, since its transition temperature in the 50 to 100 oersted region is 4.2° K., the boiling point of helium at a pressure of one atmosphere. This temperature is attainable without the use of complicated pressure or vacuum equipment for raising or lowering the temperature of helium. Niobium, which has a relatively high quenching field (the field strength required to render a superconductive material resistive), is usually used as the material for the control coil since it is desirable, and in many cases necessary, that the control conductor remain superconductive throughout the operation of the cryotron, and this coil is subject to substantially the same magnetic fields as those imposed on the gate conductor. Moreover, in most applications it is desirable to have the control conductor in the form of a coil such as coil 4 in Figure 2 in order to reduce the current necessary to produce a quenching field.

In cryotron circuitry the gate conductor of one cryotron is often connected in series with the control conductor of another, and therefore the cryotron must provide a current gain for successful operation of the circuit, i.e. the current controlled by the gate conductor of the cryotron should be larger than that required to energize the coil. If the control conductor is not in the form of a coil, the current through the conductor required to quench the tantalum gate may produce a field large enough to cause self-quenching of a tantalum gate connected in series with it. In practice it has been found that suitable current gain is obtained in a cryotron having a .009 inch tantalum gate conductor with a single layer control coil of .003 inch niobium wire having 250 turns per inch.

A simple bi-stable element, the basic unit of a binary digital computer, may be formed with cryotrons by connecting two of the units in parallel and arranging to have one or the other conduct all the current through the combination much in the same manner as a vacuum tube flip-flop. Thus, as shown in Figure 3, a cryotron flip-flop may comprise two cryotrons K1 and K2 whose gate conductors K1g and K2g are connected together and to a power supply, illustratively shown as a battery 6, through a limiting resistor R1. Preferably resistor R1 is of much higher resistance than the flip-flop circuit, so that the power supply is essentially a constant current source. Gate conductor K1g is connected in series with control coil K2c, and gate conductor K2g is similarly connected to control coil K1c. The control conductors are returned to ground to complete the circuit through read-in cryotrons K3 and K4 and read-out cryotrons K5 and K6 to be described. When conductor K1g is resistive and conductor K2g is superconductive, an entirely superconductive path is formed through conductors K2g, K1c, K3g, and K5c. The path through the series combination including conductor K1g is resistive at this time. Thus all the current from the power supply will flow through gate conductor K2g and none through conductor K1g, and this same current flowing through control coil K1c will keep the gate conductor K1g enclosed therein in the resistive state. The flip-flop is thus stable in this position, much as a conventional bi-stable vacuum tube flip-flop is stable in one position or the other. If the available current from the power supply is less than twice that required to quench one of the gate conductors, and if a pulse is applied to control winding K3c to quench gate conductor K3g to make the path including conductor K2g resistive, the current divides approximately equally between the two paths. There is now insufficient current flow through control conductor K1c to maintain the gate conductor K1g in its resistive state. As gate conductor K1g changes from a resistive to a superconductive state, a superconductive path is formed through it and gate conductor K4g and control conductor K6c so that all the available current flows through this path to quench gate conductor K2g. The flip-flop has thus reached its other stable position.

Similarly, a current pulse of sufficient magnitude applied to control conductor K4c will cause the flip-flop to revert to the former position. Gate conductors K5g or K6g will be quenched depending on whether the superconductive path through the flip-flop is through control conductor K5c or K6c and, therefore, the conductive state of these two gate conductors is indicative of the position of the K1—K2 flip-flop.

Prior to my invention, the "switching time" or time required for the flip-flop to switch position was on the order of 500 microseconds. For certain high speed computing systems this is much too slow, since it greatly increases the required computing time when many operations are to be performed. The speed of the cryotron as a circuit element is dependent upon the various inductances and resistances in the cryotron circuits and is best explained by describing in greater detail the apparent sequence of operation of the circuit in Figure 3. Assume that gate conductors K2g and K1g are respectively resistive, and superconductive and that a large current pulse is passing through the read-in coil K4c. Gate K4g becomes resistive almost immediately and the current through it begins to drop after the application of the pulse to the control coil. This decrease is impeded by the inductances of control coils K2c and K6c which are in series with conductors K4g and K1g. Thus the resistive gate K4g and the two control coils form a simple series resistance-inductance circuit, and the time constant for this current decrease is proportional to the total inductance of the two coils and inversely proportional to the resistance of the gate conductor K4g. When the current through the path defined by gate K1g, coil K2c, gate K4g, and coil K6c has dropped to a level such that control coil K2c can no longer maintain gate K2g in a resistive state, it becomes superconductive and current through it begins to increase more rapidly, this increase being similarly delayed by the inductances of control coils K1c and K5c. This increase in current continues until it is of sufficient magnitude to make gate conductor K1g resistive.

At this time the current pulse applied to the read-in cryotron K4 may be discontinued, for the function of the resistance of the gate conductor K4g may now be taken over by that of conductor K1g. The flip-flop continues transition until the current through conductor K2g has reached the maximum value as limited by the resistor R1 and current through gate K1g has diminished to zero. The time required for the build-up of current through gate conductor K2g to the transition level is relatively small for two reasons, to wit: there is no resistance to impede the current flow occurring in this circuit after this conductor becomes superconductive and the gate conductors K1g and K5g are superconductive prior to this time, thereby considerably reducing the inductance of control windings K1c and K5c in a manner to be described.

Conversely, the time required for the current through gate conductor K1g to drop to the threshold level is comparatively large because gate conductors K2g and K6g are resistive during the time the current is decreasing. Thus coils K2c and K6c have maximum inductance, and the actual resistance of conductor K4g, even though resistive, is rather low. Thus, the time constant of this circuit defined by the ratio of total inductance to total resistance is relatively high. For example, if the control windings have normal inductances of $\frac{1}{10}$ microhenry and the resistance of the gate conductor is .001 ohm, the time constant of the series combination of conductors K2c, K4g, and K6c is 200 microseconds.

In general, the cryotrons in a typical circuit have identical construction, their gate conductors and control windings having the same resistances and inductances. Therefore it is common to refer to the "time constant" of a cryotron, i.e. the inductance of its control winding divided by the resistance of its gate conductor, although, as described above, the control conductor of one cryotron is generally connected in series with the gate conductor of another. From the description given, it will be seen that, to increase the operational speed of cryotron circuits, it is desirable to reduce the time constant of individual cryotrons to the lowest possible level.

Accordingly, it is a general object of my invention to provide a superconductive computer element capable of high speed operation. A more particular object of my invention is to provide a computer element of the above character having a gate conductor capable of transition between the superconductive and resistive states under influence of the intensity changes of the magnetic field imposed thereon, together with a control conductor capable of providing such a magnetic field. A further object of my invention is to provide a cryotron having a gate conductor of relatively high resistance. Another object of this invention is to provide a cryotron having a control conductor of relatively low inductance. A still further object of my invention is to provide a cryotron of the above character which is simple in construction and compact in size. Further objects of this invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

In general, I have provided a cryotron having a substantially lower time constant than those now available. This is accomplished by increasing the resistance of the gate conductor and decreasing the inductance of the control winding.

The resistance of the gate conductor is increased by constructing it in the form of a thin walled cylinder, which may have a high resistance or an insulated core. The cross sectional area of this conductor may thus be decreased to a fraction of its former value and the resistance correspondingly increased. To further increase the resistance, I prefer to use a relatively high resistance alloy to be described.

To decrease the inductance of the control winding, the gate shell or cylinder contains a diamagnetic core, preferably of superconductive material. Superconductive materials are impermeable to magnetic flux. Quite possibly this is because upon the imposition of magnetic fields eddy currents are set up in such materials, giving rise to secondary fields of equal intensity and opposite direction to that of the imposed fields. Thus the net field through the material is zero and thus no flux can pass through it. While this is one of several possible theories, my invention does not depend on the reason for this phenomenon, but merely on the fact that it exists. Therefore, with a superconductor forming a large portion of the cross sectional area within the control winding, the inductance of the winding is greatly reduced. Accordingly, by substantially increasing the resistance of the gate conductor and decreasing the inductance of the control winding, cryotrons made according to my invention have time constants which are less than $\frac{1}{4000}$ of those now available. With cryotrons of this type, digital computers may be made which are correspondingly faster than those previously made, thus reducing materially the amount and complexity of equipment required to complete a given problem within a given time.

Turning now to Figure 4, I have here illustrated an embodiment of my improved cryotron, it being understood that the details of construction may be considerably varied without departing from the principles of my invention. Thus the core 8 of my cryotron is preferably a superconductor at the temperature of operation of the device, although under some circumstances a core of high resistance or non-conducting material may be used. About core 8 there is formed a thin electrically insulating sleeve 10 which insulates the core from the gate conductor 12 which takes the form of a thin-walled cylinder as previously described. A control coil 14 closely wound around the gate conductor provides a magnetic field to quench it when energized; and a lead wire 16 secured to the gate conductor 12 by welding or other suitable means may serve to connect it to other circuit elements.

In the preferred embodiment of my invention, core 8 is made of niobium and the gate conductor 12 of tantalum. Thus the core is superconductive at liquid helium temperatures, but a magnetic field sufficient to quench the gate conductor is then insufficient to change the core to the resistive state. The core preferably has a diameter of approximately 9 mils, although this dimension may be varied. The lower limit of core diameter depends upon the smallest diameter into which the control coil 14 may be formed. The insulating layer 10, which may of course be dispensed with when the core 8 is formed from non-conducting or highly resistive material, should be as thin as possible. I have found that a one-half mil layer of polytetrafluoroethylene formed by dipping the core in a water emulsion of this material and then sintering the material in accordance with well-known techniques is suitable for this purpose. Thinner insulation may be obtained by anodizing the niobium core to form a thin non-conducting oxide layer thereupon. The gate conductor 12 should also be as thin as possible to provide maximum electrical resistance. Thus it may be formed by evaporating the tantalum on the insulating layer 10 to a thickness of $\frac{1}{40}$ mil or less in accordance with conventional techniques. By making the cross sectional area of this gate conductor small, its resistance may be increased by a factor 100 or more. The resistance of the gate conductor 12 may be further increased by a factor of 10 by forming it from an alloy consisting of vanadium and palladium substantially in the ratio of 99 to 1.

The control coil 14 is preferably made from 3 mil niobium or lead wire, closely wound to provide approximately 280 turns per inch. Niobium or lead are the preferred materials, as they are not quenched during operation of the cryotron. The wire should have an insulation thereabout of minimum thickness, e.g. 0.25 mil of conventional enamel insulation. Thus, when the gate conductor 12 is resistive, the cross sectional area within the control coil 14 through which lines of magnetic flux may pass includes only the insulation of the core, the gate conductor, and the insulation of the control coil; these layers in the stated example form an annular shell having a width of approximately 1.3 mils and an inner diameter of approximately 9 mils. The area within the coil through which flux may pass is thus reduced to approximately ¼ of that through which flux could normally pass because of the presence of the superconductive core. The inductance of the control coil is correspondingly reduced to further decrease the time constant. By the use of the superconducting core 8 and the thin-walled gate conductor 12, I have provided a cryotron in which the gate resistance is increased by a factor of 100 or more and the control coil inductance is decreased by a factor of 4 or more to thereby reduce the time constant of the entire device by a factor of 400 or more over prior cryotrons. If, in addition, the resistivity of the gate conductor is increased by the use of the above vanadium-palladium alloy, the time constant may be reduced by a factor of upwards of 4000.

In another embodiment of my invention illustrated in Figure 5, the core 8 may take the form of a superconductive shell 8a of niobium, lead, or the like surrounding an inner core 8b. Core 8b may be an electrical insulator or conductor having suitable structural properties, i.e. polytetrafluoroethylene. Shell 8a is an elongated ring, and essentially no net external flux can be passed through a superconductive ring, a fact which may be explained by the theory outlined above. Thus this core having an outer layer of superconductive material performs the same function as does the solid superconductive core of the embodiment of Figure 4.

Thus I have provided a cryotron for use as an element in high speed digital computers or the like having a substantially reduced time constant. This low time constant is achieved by increasing the normal resistance of the gate conductor of the cryotron and by decreasing the inductance of its control coil. The thin shell used as a gate conductor has a minimum cross section and therefore relatively high resistance, and the superconductive core inserted therein decreases the inductance of the control coil.

It will be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, may be said to fall therebetween.

I claim:

1. An electrical circuit element comprising, in combination, a control conductor, a gate conductor associated therewith said gate conductor being of a material which is superconductive at the temperature of operation of said element in the absence of an applied magnetic field and capable of transition between states of superconductivity and resistivity under the influence of a magnetic field produced by current flowing in said control conductor, said gate conductor being in the form of a thin walled elongated shell to increase its electrical resistance and thereby decrease the time constant of said element.

2. The combination defined in claim 1 in which the material of said control conductor is superconductive at the temperature of operation of said device in the absence of an applied magnetic field and remains superconductive in the presence of the magnetic field used to render said gate conductor resistive.

3. An electrical circuit element comprising, in combination, a control conductor, a gate conductor in close proximity to said control conductor, said gate conductor being of a material which is superconductive at the temperature of operation of said element in the absence of an applied magnetic field and capable of transition between states of superconductivity and resistivity under the influence of a magnetic field produced by current flowing in said control conductor, said gate conductor being in the form of a thin walled elongated shell to thereby increase its resistance, said control conductor being formed into a coil wound about said gate conductor.

4. An electrical circuit element comprising, in combination, a control conductor, a gate conductor in close proximity thereto being superconductive at the temperature of operation of said element in the absence of an applied magnetic field and capable of transition to a state of resistivity under the influence of the magnetic field produced by current flowing in said control conductor, a core, said gate conductor being disposed about said core in the form of a thin walled elongated shell, to increase the resistance of said gate conductor and thereby reduce the time constant of said element.

5. The combination defined in claim 4 in which said core includes a portion which is superconductive and is of material which requires a stronger magnetic field to render it resistive than does said gate conductor, whereby said portion may remain superconductive throughout operation of said element, thereby to decrease the inductance of said control conductor, said portion being electrically insulated from said gate conductor.

6. The combination defined in claim 4 in which said control conductor is of a material which is also superconductive at the temperature of operation of said element in the absence of an applied magnetic field and requires a greater field to render it resistive than that produced in it by a current which renders said gate conductor resistive, whereby it may remain superconductive during operation of said element.

7. The combination defined in claim 4 in which said core is of a material having substantially greater resistivity than that of said gate conductor.

8. The combination defined in claim 7 in which said core is of a non-conductive material.

9. An electrical circuit element comprising, in combination, a control conductor, a gate conductor associated therewith which is superconductive at the temperature of operation of said element in the absence of an applied magnetic field and which is in close proximity thereto so as to be rendered resistive by the influence of the magnetic field produced by current flowing in said control conductor, said gate conductor being in the form of a thin walled shell to increase its resistivity, and an object disposed within said shell and having a surface substantially coextensive with the inner periphery thereof, said object containing material which is superconductive at the temperature of operation of said element when no magnetic field is applied thereto and which requires the application of a stronger magnetic field to render it resistive than does said gate conductor, whereby current flowing through said control conductor may render said gate conductor resistive while leaving said object superconductive, thereby to minimize the inductance of said control conductor and decrease the time constant of said element.

10. The combination defined in claim 9 which includes a thin layer of insulation between said object and said shell.

11. The combination defined in claim 9 in which said shell has a substantially cylindrical figuration and in which said object has a corresponding configuration to interfit therewith.

12. The combination defined in claim 9 in which the superconductive material in said object is in the form of a ring.

13. The combination defined in claim 9 in which said object is a wire extending longitudinally of said gate conductor.

14. An electrical circuit element comprising, in combination, a control conductor, a gate conductor associated therewith which is superconductive at the temperature of operation of said element in the absence of an applied magnetic field and which may be rendered resistive under the influence of a magnetic field produced by current flowing in said control conductor, said gate conductor being in the form of a thin walled hollow cylinder to thereby increase its resistance, a core disposed within said gate conductor and insulated therefrom, said core being of a material which is normally superconductive at the temperature of operation of said element and which requires a stronger magnetic field to render it resistive than does said gate conductor, whereby it may remain superconductive throughout operation of said element, said control conductor being in the form of a coil wound about said cylinder, whereby the inductance of said coil is minimized to thereby decrease the time constant of said element.

15. The combination defined in claim 14 in which said gate conductor is of tantalum and said core is of niobium.

16. An electrical circuit element comprising in combination, a control conductor, a gate conductor, said conductors being of materials which are superconductive at the temperature of operation of said element in the absence of an applied magnetic field and capable of transition from superconductivity to resistivity under the influence of applied magnetic fields, said control conductor being in the form of a coil wound about said gate conductor, said gate conductor being in the form of a thin-walled elongated shell to increase its resistance and thereby decrease the time constant of said element.

17. The combination defined in claim 16 in which said control conductor is of a material requiring a stronger magnetic field to render it resistive than said gate conductor, whereby said control conductor may remain superconductive throughout operation of said element.

References Cited in the file of this patent

UNITED STATES PATENTS

| | | |
|---|---|---|
| 2,189,122 | Andrews | Feb. 6, 1940 |
| 2,522,153 | Andrews | Sept. 12, 1950 |
| 2,533,908 | Andrews | Dec. 12, 1950 |
| 2,832,897 | Buck | Apr. 29, 1958 |

OTHER REFERENCES

Slade et al: "A Cryotron Catalog Memory System," Proc. of The Eastern Joint Computer Conference, Dec. 10–12, 1956.